UNITED STATES PATENT OFFICE.

MEYER L. RHEIN, OF NEW YORK, N. Y., ASSIGNOR TO LIZBETH E. VAN WYCK RHEIN, OF NEW YORK, N. Y.

DENTIFRICE.

14,961. Specification of Reissued Letters Patent. Reissued Oct. 19, 1920.

No Drawing. Original No. 1,297,494, dated March 18, 1919, Serial No. 220,512, filed March 5, 1918. Application for reissue filed August 11, 1920. Serial No. 402,888.

*To all whom it may concern:*

Be it known that I, MEYER L. RHEIN, a citizen of the United States, residing at the city of New York, borough of Manhattan, county and State of New York, have invented a certain new and useful Dentifrice, of which the following is a specification.

Heretofore the efforts of dentists have been directed mainly, to repairing the destructive effect of caries upon the teeth, whereas the trend of the more recent practice is the prevention of all dental disease.

The teeth are normally bathed in a salivary solution, the mucin or mucinate of which tends to adhere tenaciously at different places on the enamel surface. Salivary mucin tends to form sticky mixtures containing countless bacteria and carbohydrates and other debris from the mouth, such mucin finding lodgment against the enamel surface in the form of a film or membrane, and sometimes contains mucin acid in solid or flake form, the same being commonly referred to in dentistry as bacterial plaques or "mucin plaques." In the initial stage, the presence of such mucin adhesions or plaques cannot be easily distinguished from the enamel surface of the teeth, the daily accretions of such mucin adhesions rendering the total removal thereof increasingly difficult. It has been established that the bacteria present in the mucin adhesion upon the enamel surfaces produce an acid which exerts decalcifying effects upon the enamel, and such enamel, when once destroyed, even to a minute extent, exposes the dentine to attack by the bacteria, producing caries. Accordingly, preventive dentistry is directed to keeping the enamel surface free, or to a material extent free, from such bacterial plaques and mucin adhesions, so as to preclude decay. The tenacity of the adhesion of bacterial plaques and mucin adhesion to the enamel surface varies according to the character and condition of the saliva in different individuals, but in practically all cases, the attachment is so firm and intimate that very considerable abrasive effort is required for the dislodgment of such plaques and adhesions.

Dentifrices are generally of an alkaline nature, for the reason that it has been sought to avoid bringing into contact with the teeth any agent capable of aiding decalcification, the alkalinity of such dentifrices tending in a great measure to impair the efficiency thereof, more particularly as the media for the dislodgment of bacterial plaques and mucin adhesions. A weak acid solution has the effect of curdling the mucin film and of dislodging the plaques and adhesions from the enamel surface, but the well known decalcifying effect of some such acid solutions upon the enamel surface has acted heretofore as a deterrent to the use of any acids in dentifrices. In the present invention however, a solid acidic substance is employed as one ingredient of the new dentifrice for the purpose of curdling and detaching the "mucin plaques," under such conditions of use as to preclude all possibility to decalcification arising from the presence of such acidic substance in the dentifrice.

In order to detect the presence or absence of mucin adhesions, either as a film or membrane or as an acid in flaky condition, resort is frequently had by dentists to a disclosing solution, composed usually of iodin in a weakened condition, the application of which to teeth whereon mucin is present tends to impart to such mucin adhesions the characteristic yellow color of the iodin solution, whereas such application to teeth free from mucin adhesions has no perceptible effect so far as concerns discoloration of the enamel surface.

The dentifrice combines with the solid acidic substance a certain basic agent, preferably sodium bicarbonate which, in the presence of moisture, reacts with the acidic substance to set free carbonic acid in solution in contact with the enamel surface. The action of the carbonic acid upon the teeth is followed immediately by, or attended simultaneously with, the production of an alkaline medium afforded by the solution of certain alkaline salts, supplemented by the natural alkaline saliva, the flow of which is perceptibly increased by the action upon the salivary glands of the carbonic acid solution employed primarily as the means for flocculating and dislodging the mucin adhesions.

Experience shows that the presence of acids in the mouth very materially increases both the amount and alkalinity of saliva, and, further, that weak solutions of certain forms of acid are efficacious in flocculating and dislodging mucin adhesions upon the teeth. The stimulation by acids of the salivary flow is an important function obtained by the employment in my dentifrice of a solid acidic substance, and as such flow continues for an appreciable length of time after completing the operation of brushing the teeth, it is apparent that the teeth are bathed in the saliva the flow and alkalinity of which are increased so as to exert a neutralizing and cleansing effect in the mouth for a considerable period afterward, thereby precluding deleterious manifestations upon the enamel surface exhibited by erosion or disintegration. Another important feature of the invention is that the carbonic acid generated in the mouth by the reaction of the alkaline salt and the acid salt serves, by its effervescence to assist physically in the breaking down and removal of the mucin plaques, in addition to its chemical action.

The soluble alkaline salt which it is preferred to employ is bicarbonate of soda, the same being supplemented by other alkaline agents, such as precipitated calcium carbonate and sodium oleate. The specified alkaline agents, singly or in combination, afford an abrasive the action of which is comparatively mild and which is also mildly alkaline, the quantity of the alkaline solution artificially produced by such agents augmenting the alkalinity of the saliva which is, as before stated, increased by the stimulating action of the carbonic acid solution upon the salivary glands. Another function of the alkaline solution produced artificially in the mouth by the decomposition of the alkaline salts is to neutralize any destructive (*e. g.* lactic) acid resulting from the presence in the mouth and in the interdental spaces of organisms resulting from food fermentation.

The froth evolved by the solution and agitation of the sodium oleate tends to fortify the effervescent effect produced by the reaction of the solid acidic substance with the sodium bicarbonate, and such soapy froth acts, also to dislodge from the teeth such forms of the slimy film as are due to fatty matters derived from food fermentation.

The dentifrice is in the form either of a dry powder or of a paste, the solid acidic substance and the alkaline salts being in the latter case (paste form) incorporated by the addition of a neutral water-free agent, such as glycerin or any concentrated gummy substance, like gum arabic, practically free from water, whereby the alkaline agents and the solid acidic substance are restrained from decomposition or until introduced into the mouth so as to become activated by the water in the saliva.

The composition is as follows, although it is to be distinctly understood that the proportions may be changed in substantial particulars without departing from the spirit of the invention:—

| | |
|---|---|
| Calcium carbonate (precipitated chalk) | 34 lbs. |
| Bicarbonate of soda | 4 " |
| Sodium oleate | 4 " |
| Potassium bitartrate | 8 " |
| Saccharin | 10 grs. |

and suitable flavoring agents such as—

| | |
|---|---|
| Oil of gaultheria | 18 oz. |
| Oil of peppermint | 9 " |

In the above formula, the quantities specified are for a mass aggregating in weight fifty pounds (50 lbs.): but of course any desired quantity may be prepared, the specified proportions being usually retained. The compounding of the mass is carried out in any preferred way, the flavoring agents being incorporated and the ingredients intimately mixed mechanically to produce an impalpable powder.

Although I have stated that potassium bitartrate is used as the soluble acidic substance it is to be distinctly understood that the invention is not restricted to this particular substance, for the reason that I may employ other acid salts performing the functions herein specified, such *e. g.*, as acid sodium citrate, and others obtainable from fruits.

The calcium carbonate and the sodium oleate in addition to their functions as alkaline agents furnish a mild abrasive in the operation of brushing the teeth, and, furthermore, the froth due to solution and agitation of the sodium oleate tends to penetrate the interdental cavities so as to dislodge from the teeth such slimy films as are due to fatty matters derived from food.

It is apparent that the dentifrice, either as a dry powder or as a paste, should be carried in the required limited quantity by a brush to the teeth, and applied by vigorously brushing, suitable moisture being utilized either by dampening the brush or by the addition of saliva or both, so as to effect reaction between the acid salt and the bicarbonate of soda to thereby produce carbonic acid in solution, and concurrently therewith to produce a soapy froth. The decomposition of the acid salt and of the required moisture produces a mutual reaction according to the general formula:—

$$\text{Tartrate } KH + NaHCO_3 = \text{Tartrate } KN_a + H_2CO_3$$

From what has been said it is apparent that the function of the acid salt is, primarily, to generate a weak carbonic acid solution which curdles or flocculates the slimy mucin film or gelatinous membrane and dislodges the same from contact with the enamel surface, and, secondarily, such carbonic acid solution stimulates the salivary glands so as to result in the flow of saliva increased materially in amount and alkalinity the effect of which is to neutralize any destructive acidity and to carry forward this process for a considerable period subsequent to the application of the dentifrice.

Although alkaline agents in a dentifrice act usually as a salivary depressant, in my invention the specified tendency is counteracted by the action of the carbonic acid solution in stimulating the flow of saliva at the time of and subsequent to the period of application to the teeth and, moreover, the salivary stimulation is enhanced by the addition of oil of gaultheria and oil of peppermint as the flavoring agents. The dentifrice is agreeable to the taste, for the reason that the potassium bitartrate which I preferably use is well adapted to the salivary glands, and such dentifrice is sweetened by the addition of saccharin. Furthermore, the dentifrice is harmless in the mouth, and no harm results should it be swallowed in even fairly large quantities.

The invention involves the fundamental discovery that the inherently weak carbonic acid solution produced in contact with the teeth is fully effective chemically and physically to break down the mucin plaques, whose removal is then made possible by the abrasive effort involved in the use of the dentifrice, and that even this weak acid solution is promptly neutralized so as to prevent its attack upon the enamel.

What I claim is:

1. A dentifrice including an abrasive and including a solid acidic substance, compounded with a carbonate, mutually reactive in the mouth to produce a carbonic acid solution, which carbonic acid solution, in conjunction with the abrasive effort involved in the use of the dentifrice, acts to dislodge and remove the mucin adhesions upon the enamel of the teeth, a basic reaction in the mouth being finally attained.

2. A dentifrice including an abrasive and including an organic acid salt compounded with a carbonate mutually reactive in the mouth to produce a carbonic acid solution, which carbonic acid solution, in conjunction with the abrasive effort involved in the use of the dentifrice, acts to dislodge and remove the mucin adhesions upon the enamel of the teeth, a basic reaction in the mouth being finally attained.

3. A dentifrice including an abrasive and including potassium bitartrate compounded with sodium bicarbonate mutually reactive in the mouth to produce a carbonic acid solution, which carbonic acid solution, in conjunction with the abrasive effort involved in the use of the dentifrice, acts to dislodge and remove the mucin adhesions upon the enamel of the teeth, a basic reaction in the mouth being finally attained.

4. A dentifrice including calcium carbonate and suitable flavoring and sweetening agents, and including potassium bitartrate compounded with sodium bicarbonate mutually reactive in the mouth to produce a carbonic acid solution, which carbonic acid solution, in conjunction with the abrasive effort involved in the use of the dentifrice, acts to dislodge and remove the mucin adhesions upon the enamel of the teeth, a basic reaction in the mouth being finally attained.

5. A dentifrice including calcium carbonate and suitable flavoring and sweetening agents, and a detergent and including potassium bitartrate compounded with sodium bicarbonate mutually reactive in the mouth to produce a carbonic acid solution, which carbonic acid solution, in conjunction with the abrasive effort involved in the use of the dentifrice, acts to dislodge and remove the mucin adhesions upon the enamel of the teeth, a basic reaction in the mouth being finally attained.

6. A dentifrice including calcium carbonate, a suitable flavoring agent, saccharin and sodium oleate and including potassium bitartrate compounded with sodium bicarbonate mutually reactive in the mouth to produce a carbonic acid solution, which carbonic acid solution, in conjunction with the abrasive effort involved in the use of the dentifrice, acts to dislodge and remove the mucin adhesions upon the enamel of the teeth, a basic reaction in the mouth being finally attained.

7. A dentifrice including calcium carbonate, a suitable flavoring agent, saccharin, sodium oleate, and a neutral water-free agent, such as glycerin, and including potassium bitartrate compounded with sodium bicarbonate mutually reactive in the mouth to produce a carbonic acid solution, which carbonic acid solution, in conjunction with the abrasive effort involved in the use of the dentifrice, acts to dislodge and remove the mucin adhesions upon the enamel of the teeth, a basic reaction in the mouth being finally attained.

8. A dentifrice including an abrasive, and including a solid acidic substance and a basic substance mutually reactive in the presence of moisture to produce an initially weak acid solution followed by a weak alkaline solution, said weak acid solution stimulating salivary flow, and together with the abrasive acting to dislodge and remove mucin adhesions from the enamel surface, whereas the ensuing alkaline solution having neutralized the initially weak acid solution determines a final reactive alkaline condition in the mouth.

MEYER L. RHEIN.